(No Model.) 4 Sheets—Sheet 3.
D. M. HOLMES.
CANDY MACHINE.
No. 323,682. Patented Aug. 4, 1885.
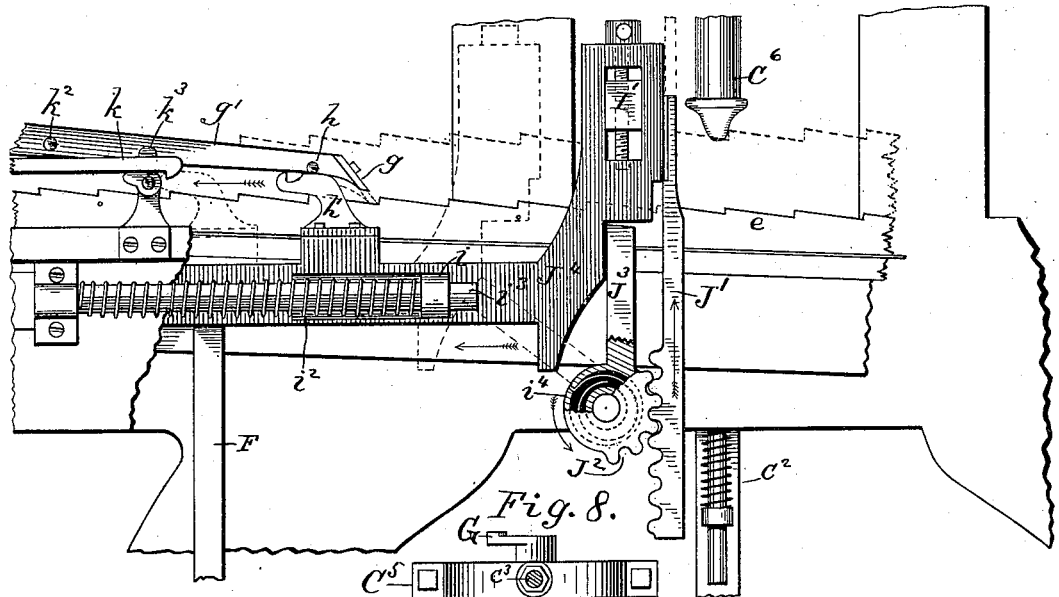
Fig. 7.
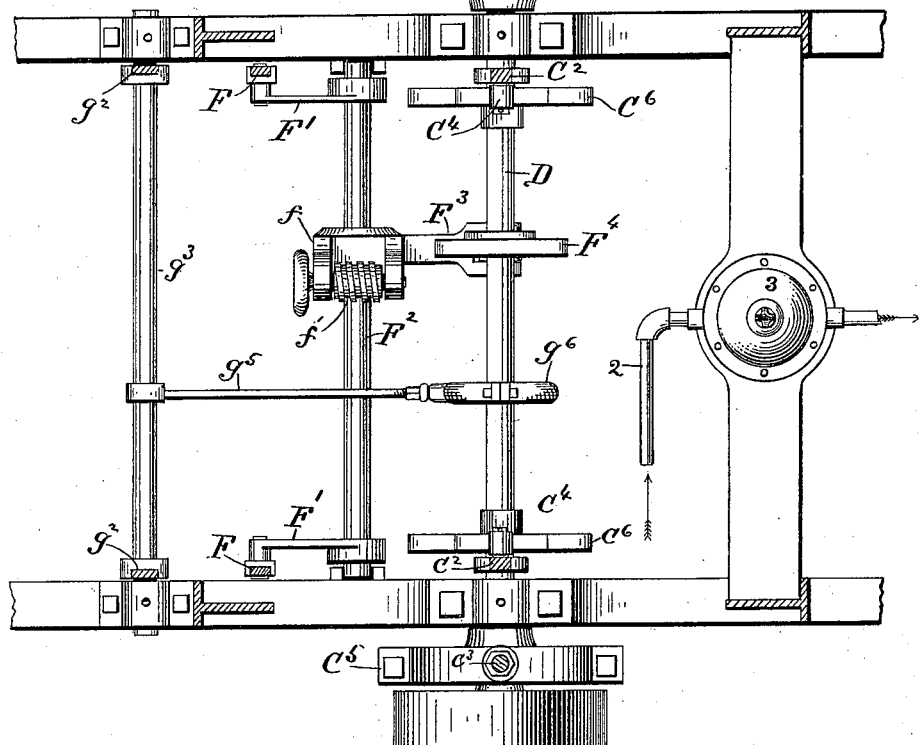
Fig. 8.
Fig. 9.
WITNESSES: Thos. Houghton, Edw. W. Byrn
INVENTOR: D. M. Holmes BY Munn & Co. ATTORNEYS.
N. PETERS, Photo-Lithographer, Washington, D. C.

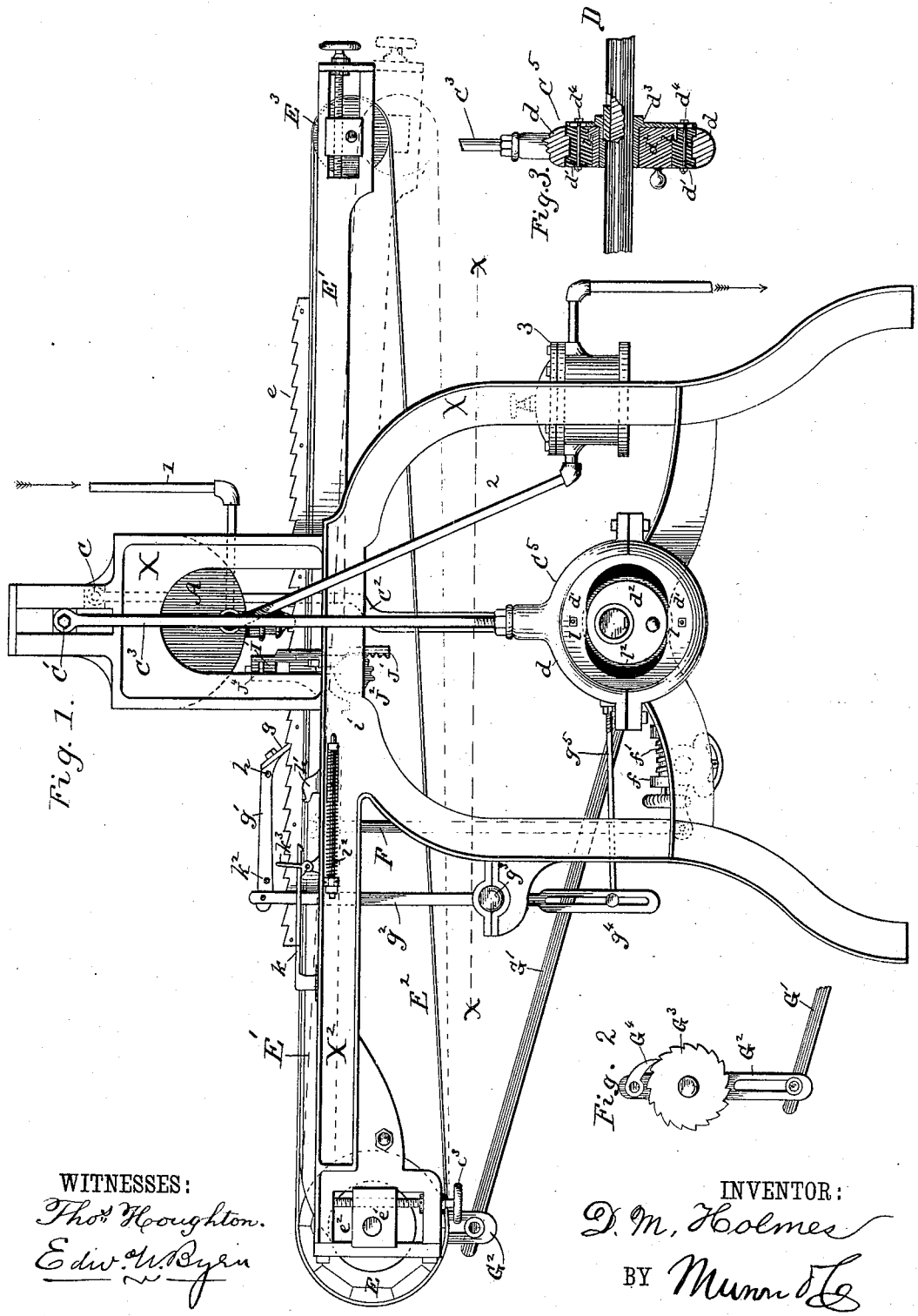

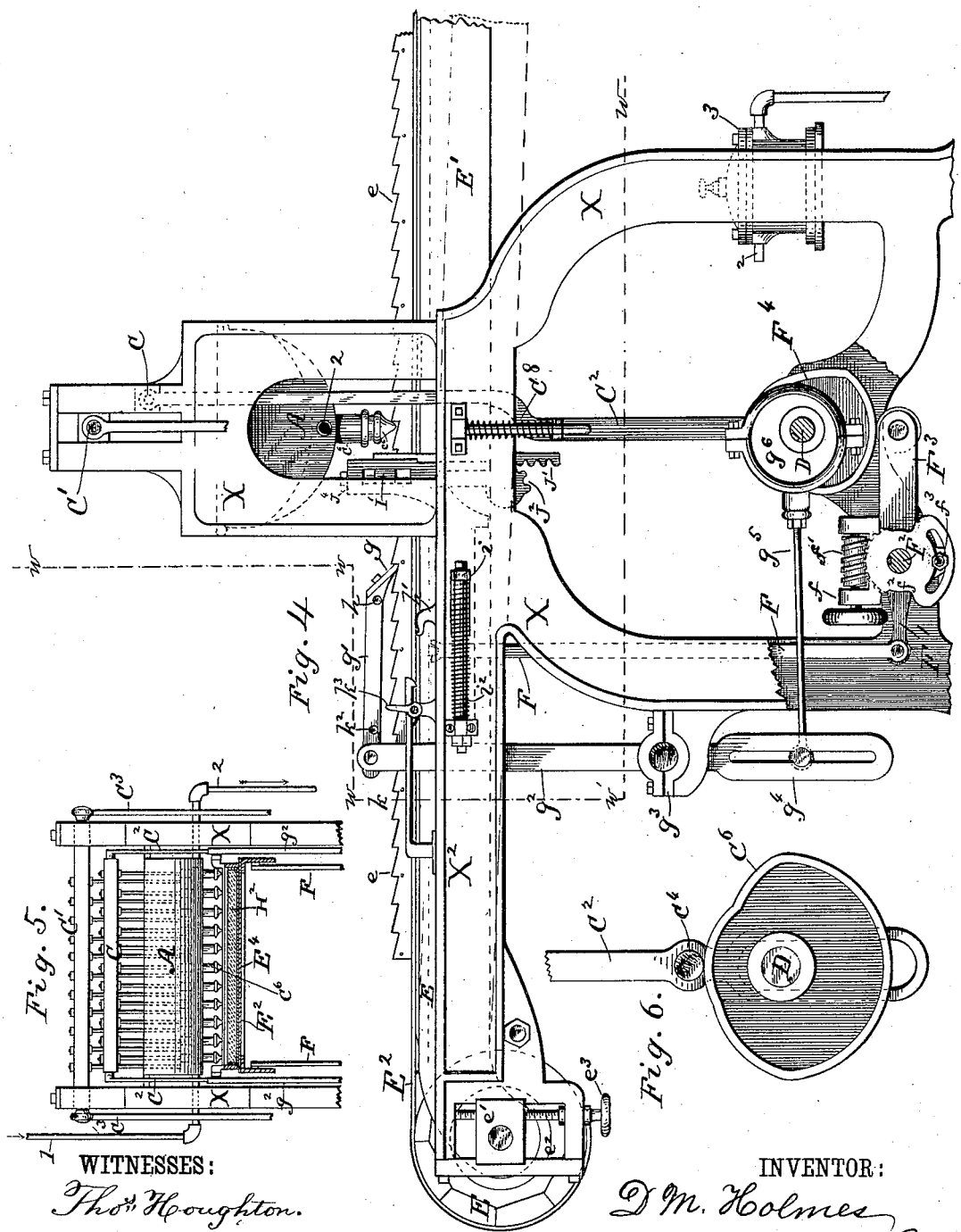

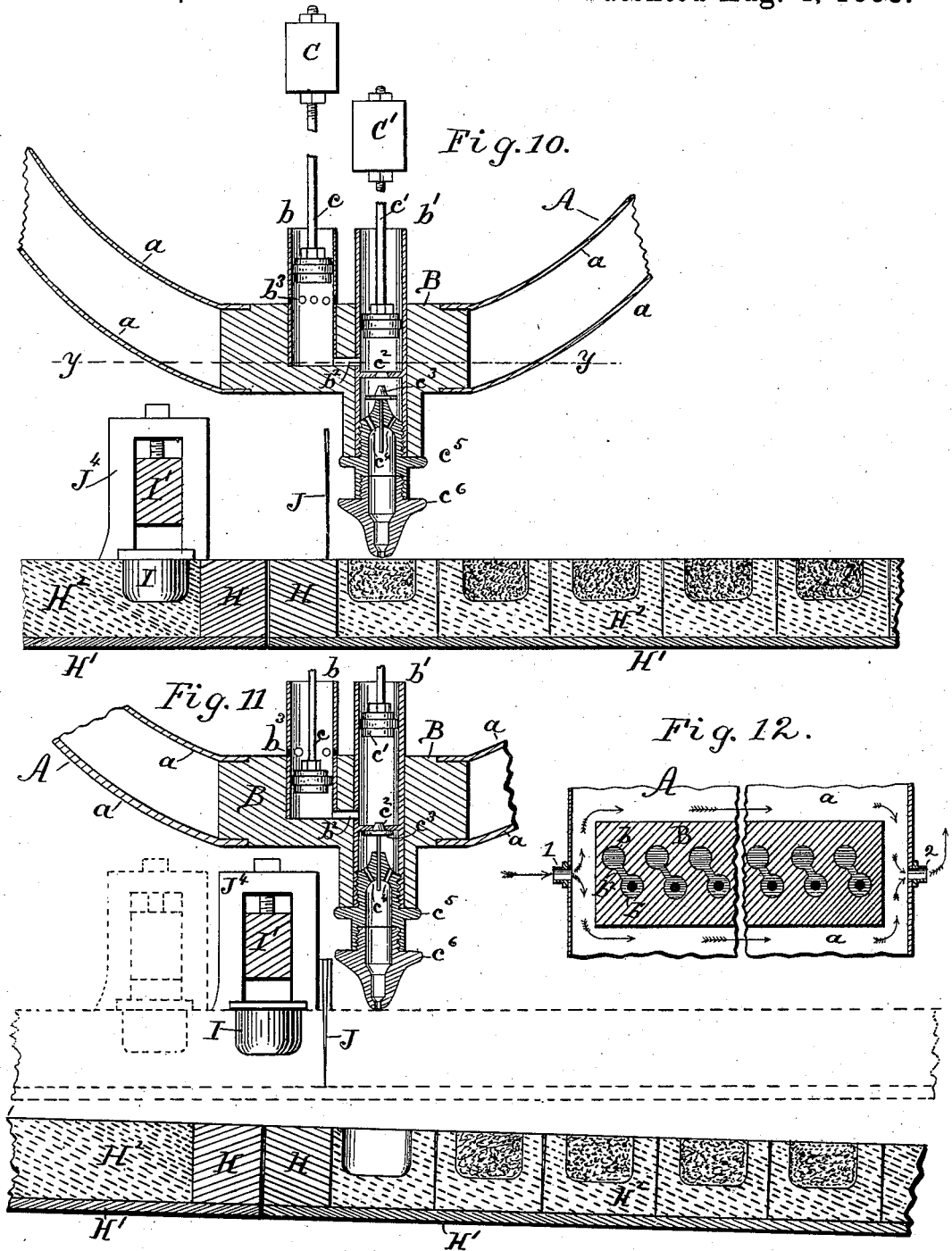

UNITED STATES PATENT OFFICE.

DANIEL M. HOLMES, OF ARLINGTON, NEW JERSEY.

CANDY-MACHINE.

SPECIFICATION forming part of Letters Patent No. 323,682, dated August 4, 1885.

Application filed January 27, 1885. (No model.)

*To all whom it may concern:*

Be it known that I, DANIEL M. HOLMES, a citizen of the United States, residing at Arlington, in the county of Hudson and State of New Jersey, have invented certain new and useful Improvements in Candy-Machines, of which the following is a specification.

Figure 1 is a side elevation of the machine. Fig. 2 is a detail showing the feeding mechanism for the endless belt. Fig. 3 is a sectional detail of the adjustable eccentric. Fig. 4 is a side elevation of the machine on a larger scale than Fig. 1, and partly broken away. Fig. 5 is a vertical transverse section of Fig. 4 on line $w\,w$ on a reduced scale. Fig. 6 is a detail of mechanism for operating one of the plunger-bars. Fig. 7 is an enlarged sectional side view of the middle portion of the machine. Fig. 8 is a horizontal section through line $x\,x$ of Fig. 1. Fig. 9 is a detail view of knife J. Figs. 10 and 11 are enlarged sectional views showing the manner of molding the candy in the trays, and Fig. 12 is a horizontal section through line $y\,y$ of Fig. 10.

The object of my invention is to provide a machine for making candies of that class which are formed or molded in drops from melted sugar; and it consists in various novel features of construction and arrangement looking to the more rapid and economical production of this kind of candy, as will be hereinafter more fully described.

The particular features of construction will require a close reference to the drawings; but in order that a general idea of the machine may be had I will state that it comprehends a steam-heated chamber which keeps the candy in a melted condition, from which chamber definite quantities are fed, either upon plates on an intermittently-moved endless apron or into pits or molds formed in starch-trays, in an automatic and continuous manner.

I will first describe the means for keeping the sugar hot and melted until deposited. A difficulty experienced with candy-machines of this class is a tendency of the stock to cool and crystallize in the feed-orifices, so that the latter become obstructed.

A is the sugar-chamber, (see Fig. 10,) which is formed of two walls, $a\,a$, between which is formed a steam-space. Steam is admitted to this steam-space through pipe 1, Figs. 1, 5, and 12, and is discharged through pipe 2 into a trap, 3, for the condensed water. In the bottom of this chamber, and entirely surrounded by the steam-space, as shown in Fig. 12, is a solid block, B, of brass or other metal, in which are arranged the feeding devices for discharging the melted sugar, whose liquefied condition is preserved, for the reason that the said block and its feed devices are maintained at a high temperature by the surrounding steam. In this block (see Figs. 10 and 11) holes are drilled to receive twin cylinders $b\,b'$, of which $b$ communicates at its bottom with $b'$ and through intermediate feed devices with the discharge-nozzles, which are arranged in a row transversely to the endless tray-belt. The arrangement of these twin cylinders is oblique, as shown in Fig. 12. The cylinder $b$ receives melted sugar from the chamber A through holes $b^3$, when its plunger $c$ rises, and when it descends it forces the same through orifice $b^2$, while plunger $c'$ in cylinder $b'$ forces it down through a hole, $c^2$, in a valve-seat, and around valve $c^3$ through holes $c^4$ in nozzle $c^5\,c^6$, and out through said nozzle onto the plates or trays. The object of valve $c^3$ is to enable it to close under hole $c^2$ on the upstroke of plunger $c'$, as in Fig. 11, and thus prevent the latter from sucking air up under the same through the nozzle, which would interfere with the regularity and uniformity of the feed. To permit the valve to be set to its place the nozzle $c^5\,c^6$ is screwed into the lower end of cylinder $b'$, while its lower section, $c^6$, is made screw-threaded, and is separable from the upper section to permit different sizes of discharge-nozzles to be fitted thereto.

It will be seen from the foregoing that for each discharge-nozzle I employ a feed mechanism consisting of two plungers, $c$ and $c'$, which secures a very positive feed, and is a feature of great importance in successfully feeding this kind of material. As the plunger $c$ rises above holes $b^3$ in cylinder $b$, the melted sugar passes through said holes to the under side of the plunger, and then as the latter descends it forces the stock beneath it through the orifice $b^2$ into the other cylinder, $b'$, beneath plunger $c'$, and as the latter descends it opens valve $c^3$ and forces the stock through the valve-opening and the holes $c^4$, and out through the nozzle. As the plunger $c'$ rises again, its suction closes valve $c^2$, preventing air from coming up into the nozzle, and drawing the stock from chamber $b$ through opening $b^2$. For operating these plungers $c$ and $c'$ their rods are connected to the cross-bars C and C', arranged transversely to the table and guided at their ends in vertical slots in the main frame X. (See Figs. 1 and 4.) The bar C is operated through rods $C^2$ $C^2$ inside the frame, having rollers $C^4$ $C^4$ resting upon cams $C^6$ $C^6$ on main drive-shaft D, (see Figs. 1, 4, 6, 8,) the rods being held down with their rollers on the cams by springs $C^8$, Fig. 4. The other bar, C', is operated by rods $C^3$ $C^3$ outside the frame, connected below to the adjustable eccentrics $C^5$ $C^5$ on main shaft D. (See Figs. 1 and 8.) The object of these adjustable eccentrics is to give to bar C' and the plungers $c'$ an adjustable throw to increase or diminish the feed at the nozzles. This adjustable eccentric (see Figs. 1 and 3) consists of outer strap, $d$, a disk and hub, $d^3$, fixed rigidly to the shaft D, the adjustable block $d^2$ having a knob-handle, and an intermediate elliptically-slotted clamping-ring, $d'$, the function of which latter is to clamp the adjustable block $d^2$ in any of its positions against the rigid disk $d^3$. This is accomplished by forming, at two diametrical points on the inner periphery of ring $d'$, two lips, $l$, that bear against a flange, $l^2$, on the adjustable block, so that (see Fig. 3) when ring $d'$ is clamped against disk $d^3$ by bolts $d^4$ its diametrical lips bear against the flange of the adjustable block and hold it likewise rigid against the disk $d^3$. To change the throw of this adjustable eccentric it is only necessary to loosen the bolts $d^4$ and turn the block $d^2$ the desired distance, and then fix it in the new position by again clamping ring $d'$ thereagainst by bolts $d^4$.

I will now proceed to describe the table and its appurtenances.

$X^2$, Figs. 1 and 4, is a horizontal off-setting portion of the main frame, which, at its extremity, carries the journal of the roller E, on which journal is hung the table-frame E'.

$E^2$ is the endless belt for supporting and carrying the trays. This belt passes around and derives motion from roller E at one end, and at the other end passes around a roller, $E^3$, mounted in the table-frame, and provided with suitable tension-regulating mechanism. Beneath the upper lay of this belt is a solid bed, $E^4$, Fig. 5, connected to the table-frame.

In depositing the candy on the trays in the table, instead of bringing the nozzles down to the table, the nozzles are made stationary, and the table is oscillated up to and away from the nozzles, as shown by dotted lines, Figs. 1 and 4. For this purpose said table is hung at one end upon the journal of roller E, and is raised and lowered about this point as a center by lift-bars F, Figs. 1, 4, and 8, catching under lugs on the table, and connected below to arms F' F' on rock-shaft $F^2$, oscillated by arm $F^3$, with anti-friction roller, and cam $F^4$ on main shaft D. This table is designed to carry two kinds of candy-receiving trays, one a flat sheet of metal, upon which flat drops—such as mint-drops—are deposited, and which are fed forward by the movement of the belt, and the other are trays with raised edges containing starch, in which impressions are made by dies to form molds of fanciful design.

Different modes of feeding these trays are required.

I will first describe the mechanism for feeding the flat metal plates. This feed is effected simply by the intermittent motion of the belt $E^2$, and for imparting this intermittent motion a crank, G, Fig. 8, on main drive-shaft D, is made to reciprocate rod G', Fig. 1, which latter is adjustably connected to the lower slotted end of oscillating lever $G^2$, hung upon the journal of roller E and bearing a pawl, $G^4$, Fig. 2, which engages a ratchet-wheel, $G^3$, fixed rigidly to roller E, so that as the main shaft revolves the oscillation of lever $G^2$ gives an intermittent step-by-step movement to the ratchet-wheel $G^3$, roller E, and belt $E^2$, that feeds successively the trays beneath the row of discharge-nozzles, allowing the candy to be deposited therein in the form of a row of drops for each movement. The most extensive use of my machine, however, will be for manufacturing so-called "French candies," in which the melted sugar or composition is molded into drops of fanciful form. Candies of this class are usually molded by hand in a bed or matrix of starch laid in trays to the depth of about three-quarters of an inch.

My invention comprehends the formation of the pits or molded hollows in these trays by machinery and the deposition of candy therein in automatic succession.

H H', Figs. 10 and 11, are the trays, which are formed of a rectangular bottom plate, H', and marginal wooden strips H, forming side walls for holding a bed, $H^2$, of starch or equivalent material for forming a matrix. To the sides of these trays I attach continuous ratchet-strips $e$, Figs. 1 and 4, which, with the vertical depth of these trays, requires the table to be lowered with respect to the candy-nozzles and the vibrating mechanism for the table to be correspondingly adjusted.

To lower the table, a vertical slot, $e^2$, is formed in the end of the projecting arms $X^2$ of the main frame, and in the slot is arranged a block, $e'$, which carries the journal of the roller E, which block is raised and lowered by set-screws $e^3$.

To correspondingly lower the lifting mechanism F F' for the table, the arm $F^3$ (see Figs. 4 and 8) is changed in its angular relation to rock-shaft D, as follows: A bracket, $f$, rigidly attached to said arm, carries a worm, $f'$, which meshes with a segmental gear, $f^2$, Fig. 4, rigidly keyed to shaft $F^2$. This worm is provided with a hand-wheel, by turning which the angular relation of arm $F^3$ to arm F' is changed, so as to allow the parts F and F' to drop down.

To hold the segmental gear rigid and prevent strain on the worm said segmental gear is provided with a curved slot, through which passes a bolt, $f^3$, that connects said gear to a rigid arm on shaft $F^2$.

In feeding the starch-trays H H' the connecting-rod G', Fig. 1, is removed, as in Fig. 4, and instead of feeding the belt through the ratchet mechanism of Fig. 2 the belt is allowed to remain stationary, and the trays, with ratchet-strips $e$ on each side, are pushed along with a step-by-step motion through a pawl-bar, $g$, extending across the table and catching into the teeth of the ratchet-bars on the trays. This pawl-bar is attached to arms $g'$ on each side of the machine, which are jointed to the upper ends of vertical oscillating arms $g^2$, connected to rock-shaft $g^3$, Fig. 8, fulcrumed in the frame-work, and having a lower projecting arm, $g^4$, slotted for adjustment, and jointed to a rod, $g^5$, connected to an eccentric, $g^6$, on the main shaft D. The normal stroke of the pawl-bar $g$ is the distance of two of the teeth of the ratchet-bars $e$; but this stroke is only effective in advancing the ratchet-bars and trays the distance of one tooth, for the reason that a pin, $h$, on arms $g$ rides during half of their stroke on hook-lugs $h'$, as shown in Fig. 7. The object of this arrangement will be explained further along.

I will now describe the means for automatically forming the pits or molds in the starch and depositing candy therein. Transversely across the table and in close proximity to the row of nozzles $c^6$, is arranged a corresponding row of dies, I, Fig. 11, fixed adjustably to a cross-bar, I', a distance from the nozzles equal to the distance between the rows of pits or molds in the trays, as in Fig. 11. These dies are relatively stationary, but project below the nozzles, so that when the table rises to the nozzles the dies bury themselves in the starch to form a new row of pits while the nozzles are discharging candy into those previously formed.

Between the nozzles and the dies there is a transverse knife, J, (see Figs. 5, 9, and 11,) which, when the trays rise toward the nozzles, buries itself in the starch between the row of empty pits which are about to receive the candy and the row of pits being formed by the dies. The object of the knife is to prevent the dies from bulging the wall of starch between the pits over into the pits which are being filled, and thus spoiling the shape of the mold.

For the sake of economy of space the rows of pits or impressions are close together, and but for this knife the dies would mutilate the shape of the row of pits previously formed.

I have already stated that starch-trays H H' are already in use, where the impressions are made and the filling is effected by hand, and as manufacturers have thousands of these trays on hand I have adapted my machine to such trays, so as to avoid the sacrifice of invested capital. These trays, however, have marginal side walls, which, at the line where two trays are juxtaposed, make a solid wooden bed that is much wider than the distance between the pits or impressions in the starch, and it is obvious that the rise of the table with the trays would, if the wooden rims were immediately under the dies, produce a breakage or obstruction in the operation of the machine. To obviate this difficulty, I make the rise of the unyielding rims of the trays beneath the dies to jump the dies from their normal proximity to the nozzles, as shown in full lines in Fig. 11, over into the starch of the next tray, as shown in dotted lines in this figure, and in full lines in Fig. 10. I accomplish this by a reactionary yielding movement of the knife, which is connected to the dies so as to shift them laterally whenever the knife is thrust upwardly by contact with the solid rims of the trays. This knife J has downwardly-projecting arms J', Figs. 7 and 9, which arms have rack-teeth formed at their lower edges that engage with a segmental pinion, $J^2$, having arm $J^3$, that bears against a horizontally-sliding frame, $J^4$, that carries the die-bar I'. This frame has a perforated lug, $i$, that slides against a spiral spring, $i^2$, on a rod, $i^3$, and on this sliding frame $J^4$ are carried the hook-lugs $h'$. Now, when the table, with trays in position shown in Fig. 11, rises, the rims H strike knife J, thrusting it upwardly, as shown by dotted lines in Fig. 7, and as it rises it turns the segmental pinion $J^2$, and arm $J^3$, bearing against frame $J^4$, swings it, with the die-bar, laterally, as shown by dotted lines in Fig. 7 and full lines in Fig. 10, so that when the table has reached the limit of its motion the dies have entered and made their impression in the starch of the next tray. The arm $J^3$ is restored to its former position by coil-spring $i^4$ in the hollow segmental pinion, and frame $J^4$ is restored by spiral spring $i^2$; but it is obvious that if the dies slide back and the trays move forward at the same time, and same distance, the dies will come down in the same pits again on the next movement. To prevent this the hook or lug $h'$, when thrown to the left in Fig. 7, is caught under spring-catch $k$ and held there while pawl-bar $g$ feeds the trays, and as pin $h$ does not now rest on lug $h'$ said pawl-bar for this stroke feeds the trays its normal distance of two notches, and at the end of the stroke another pin, $k^2$, on arms $g'$ tilts a pivoted trigger, $k^3$, which lifts spring-catch $k$ out of hook-lug $h'$ and allows spring $i^2$ to send the frame $J^4$ and dies back half the distance which the trays went forward, thus making a uniform feed.

Having thus described my invention, what I claim as new is—

1. In a candy-machine, the combination, with the stock-chamber having a hollow casing for steam-heating, of positive feed devices surrounded by the steam-chamber, and maintained at a high temperature to prevent crystallization of the candy in the feed devices, substantially as and for the purpose described.

2. The combination, with the hollow casing

A, having walls $a$ $a$, of the solid block B, having feed-chambers drilled therein, and provided with feed devices, substantially as shown and described.

3. The combination, with the stock-chamber in a candy-machine, of a positive force-feed consisting of two communicating cylinders and two plungers, one of which serves to feed from one cylinder to the other, and the other of which plungers serves to discharge the stock through nozzles, substantially as described.

4. The combination, with the stock-chamber and the discharge-nozzles, of a cylinder and plunger, and a downwardly-opening valve arranged between the plunger and nozzle to close on the upward movement of the plunger and prevent the suction of air up into the nozzles, thus promoting uniformity of feed, as described.

5. The feed mechanism consisting of block B, with detachable nozzle-sections $c^5$ $c^6$, cylinder $b$, with plunger $c$ and holes $b^3$, cylinder $b'$, with plunger $c'$, valve-seat $c^2$, and valve $c^3$, substantially as and for the purpose described.

6. The combination, with the stationary feed-nozzles in a candy-machine, of a feed-table supported at one end upon a horizontal axis, and lifting mechanism for raising and lowering the feed-table to and from the feed-nozzles, substantially as and for the purpose described.

7. The combination, with the stationary feed-nozzles in a candy-machine, and a relatively stationary row of dies for molding pits, of a feed-table having an up-and-down motion to and from the dies and nozzles, and trays with a molding matrix, whereby the rise of the table is made to mold the pits and at the same time receive candy into the previously-formed pits or molds, as described.

8. The combination, with the molding-beds and the dies, of a knife or sharp edge adapted to be buried beside the dies as they enter the molding-beds to prevent said dies from bulging the material of the matrix into the previously-formed pits or molds, substantially as described.

9. The combination, with the main frame, with projecting arm $X^2$ and the feeding devices, of the feed-table hung upon journals in the end of said arm, the lifting-rods F, arms F' F$^3$, and the main shaft D, provided with cam F$^4$, as and for the purpose described.

10. The combination, in a candy-molding machine, with the feed-nozzles, a set of corresponding dies for molding pits, and a laterally-adjustable frame carrying the same, of a subjacent table with molding-trays and a movable device, J, connected to the dies, as described, and adapted to be struck by the rims of the trays to shift the dies laterally to jump the same into the next tray, substantially as set forth.

11. The combination, with the dies and knife J, of rack-bars J', segmental pinions J$^2$, with arms J$^3$, and spring $i^4$, the laterally-adjustable frame J$^4$, carrying the dies, hook-lug $h'$, and perforated lug $i$, the pawl-bar $g$, arms $g'$, with pins $h$ and $k^2$, spring-catch $k$, tilting trigger $k^3$, and spring and rod $i^2$ $i^3$, substantially as and for the purpose described.

12. The molding-trays having ratchet-strips $e$ attached to their sides and extending the full length of same, as and for the purpose described.

13. The combination, with the molding-trays having ratchet-strips $e$ attached to their sides, of the transverse pawl-bar $g$, carried by arms $g'$, arms $g^2$, shaft $g^3$, arm $g^4$, rod $g^5$, and eccentric $g^6$ on the main shaft, substantially as and for the purpose described.

14. The combination, with the candy-feeding devices, of the table, a projecting arm, $X^2$, having a vertical slot, $e^2$, vertically-adjustable block $e'$, carrying the journal of the table, and set-screw $e^3$ for adjusting the height of the table to adapt it to operate with respect to the candy-feeding devices with trays of different thicknesses and pattern, substantially as described.

15. The combination, with the candy-feeding devices and the table hung at one end, of the lifting-bars F, arms F', rock-shaft F$^2$, adjustable arms F$^3$, having bracket $f$, worm $f'$, segmental gear $f^2$, and cam F$^4$ on the main shaft for adapting the lifting devices to the change in the level of the table, substantially as described.

16. The combination, with the plungers of a candy-feeding cylinder, of an adjustable eccentric for operating said plungers with a variable throw to regulate the feed, as described.

17. The adjustable eccentric consisting of strip $d$, clamp-ring $d'$, with lips $l$, adjustable eccentric block $d^2$, with flange $l^2$, rigid disk $d^3$ on the shaft, and bolts $d^4$, in combination with the rod C$^3$, cross-bar C', and the plungers of a candy-feeding device, substantially as shown and described.

18. The combination, in a candy-machine, with the hollow steam-heated chamber A, of the steam-pipes 1 and 2, and the trap 3 for condensed water, as and for the purpose described.

DANIEL M. HOLMES.

Witnesses:
 EDWD. W. BYRN,
 CHAS. A. PETTIT.